(12) United States Patent
Chang et al.

(10) Patent No.: US 7,163,328 B2
(45) Date of Patent: Jan. 16, 2007

(54) BACKLIGHT MODULE WITH LAMP POSITIONING DEVICE

(75) Inventors: Chih-Kuang Chang, Taichung (TW); Chih-Hsiung Lin, Changhua County (TW); Hsin-Yi Lai, Taichung County (TW); John Chungteh Pan, Taichung (TW)

(73) Assignee: Forhouse Corporation, Taichung Hsien (TW)

( * ) Notice: Subject to any disclaimer, the term of this patent is extended or adjusted under 35 U.S.C. 154(b) by 39 days.

(21) Appl. No.: 11/020,090

(22) Filed: Dec. 27, 2004

(65) Prior Publication Data

US 2006/0050500 A1   Mar. 9, 2006

(51) Int. Cl.
*F21V 7/04* (2006.01)
(52) U.S. Cl. .................. 362/561; 362/97; 362/227; 362/559; 248/49; 248/74.1; 248/346.5; 248/89
(58) Field of Classification Search .......... 362/561, 362/97, 227, 559; 248/74.1, 346.5, 89, 49
See application file for complete search history.

(56) References Cited

U.S. PATENT DOCUMENTS

| | | | |
|---|---|---|---|
| 6,618,542 B1 * | 9/2003 | Wu et al. .................. | 385/138 |
| 2002/0126965 A1 * | 9/2002 | Miyokawa ................ | 385/92 |
| 2003/0222601 A1 * | 12/2003 | Yamamoto et al. ........ | 315/291 |
| 2004/0240829 A1 * | 12/2004 | Sahlin et al. ............. | 385/136 |
| 2005/0073858 A1 * | 4/2005 | Kim et al. ................. | 362/561 |
| 2005/0157516 A1 * | 7/2005 | Chen et al. ............... | 362/555 |

* cited by examiner

*Primary Examiner*—Renee Luebke
*Assistant Examiner*—Mary Zettl
(74) *Attorney, Agent, or Firm*—Birch, Stewart, Kolasch & Birch, LLP

(57) ABSTRACT

A backlight module has a frame, on which a reflective film, lamps and a diffusive plate are provided in sequence. A plurality of positioning devices each have a base and two rings. The base has two channels, two slots and a post on a top thereof. The lamps are fitted to the rings respectively and the rings are mounted in the slots of the base respectively to rest the lamps in the channels. The base of the positioning devices are secured on the bottom plate of the frame and the posts thereof are against the diffusive plate, such that the lamp is suspended and the relative locations of the lamps, the diffusive plate and the reflective film are fixed.

7 Claims, 8 Drawing Sheets

BACKLIGHT MODULE WITH LAMP POSITIONING DEVICE

BACKGROUND OF THE INVENTION

1. Field of the Invention

The present invention relates to a liquid crystal device (LCD), and more particularly to a backlight module for the LCD, which is provided with the lamp positioning devices to locate the lamps at the predetermined positions relative to the reflective film and the diffusive film.

2. Description of the Related Art

A conventional active direct-light backlight module comprises a frame on which a reflective film, plural lamps and a diffusive plate are mounted in sequence. The lamps provide light, a part of which directly travels to the diffusive plate and a part of which is reflected by the reflective film and travels to the diffusive plate. The diffusive plate diffuses the light traveling therethrough.

The luminous intensity of the backlight module relate to the properties of the reflective film, the lamps and the diffusive film, and more particularly, the relationship of the positions of the reflective film, the lamps and the diffusive film.

The conventional backlight module fixes the opposite ends of the lamps to the walls of the frame. The tolerance of the elements and the thermal effect makes the lamps deviate from the designated locations. As a result, the luminous intensity of the backlight module might be decreased. Furthermore, the backlight modules of the same model might have various performances because the space relationships of the reflective film, the lamps and the diffusive film of each backlight modules are inconsistent.

SUMMARY OF THE INVENTION

The primary objective of the present invention is to provide a backlight module, in which the relative positions of the reflective film, the lamps and the diffusive plate are fixed.

According to the objective of the present invention, a backlight module comprises a frame having a sidewall and a bottom plate, on which a reflective film, at least a lamp and a diffusive plate are provided in sequence. At least a positioning device is mounted on the frame to support the lamp, such that the lamp is suspended from the reflective film at a predetermined distance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
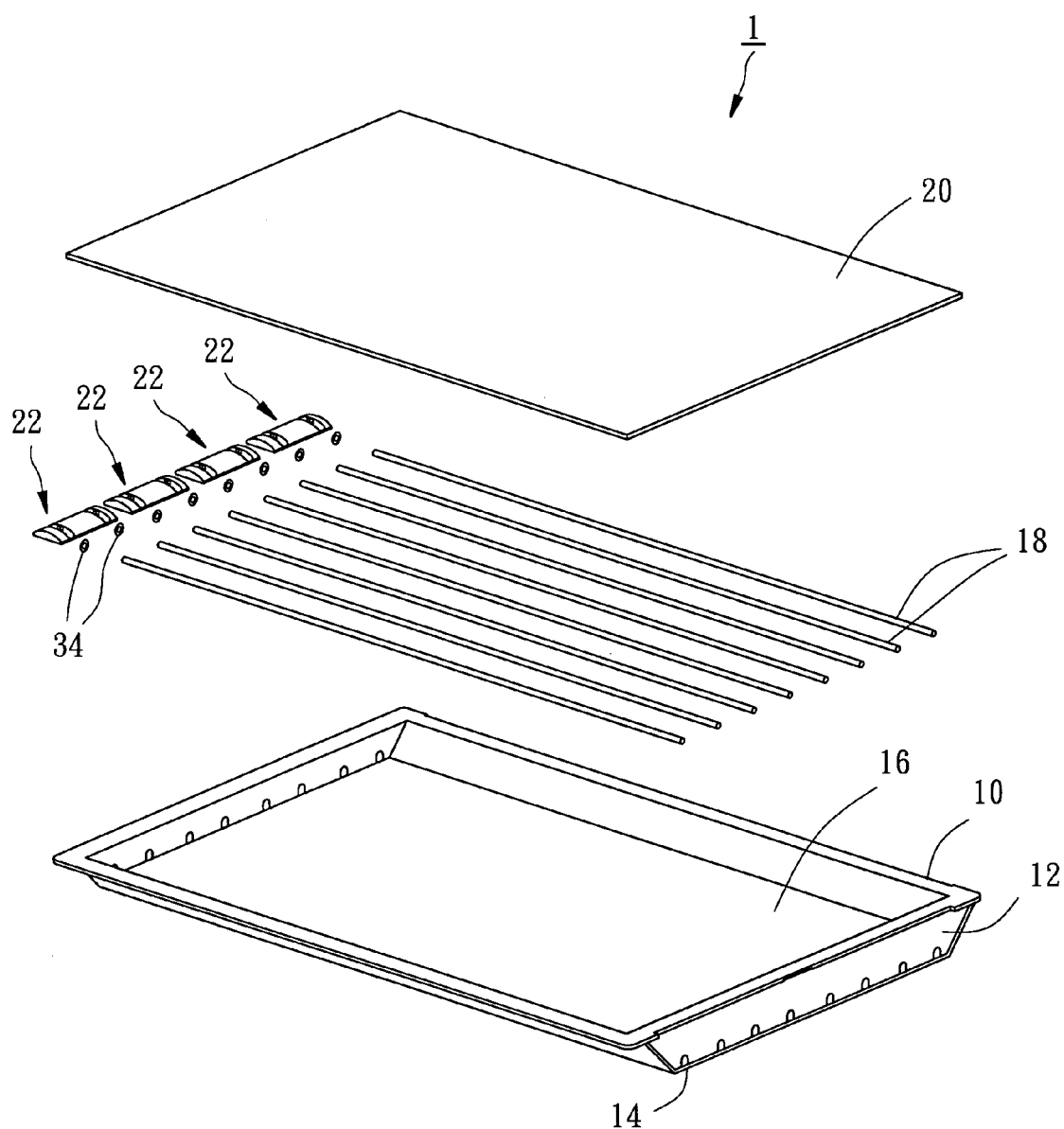
FIG. 1 is an exploded view of a first preferred embodiment of the present invention.

As shown in FIG. 1, a backlight module 1 of the first preferred embodiment of the present invention comprises a frame 10, a reflective film 16, eight lamps 18, a diffusive plate 20 and four positioning devices 22.

The frame 10 has a sidewall 12 and a bottom plate 14. The reflective film 16 is attached on the bottom plate 14 within the sidewall 12. The lamps 18 have their opposite ends fixed to the sidewall 12. The diffusive plate 20 is mounted on a top of the sidewall 12.

Figure 2:
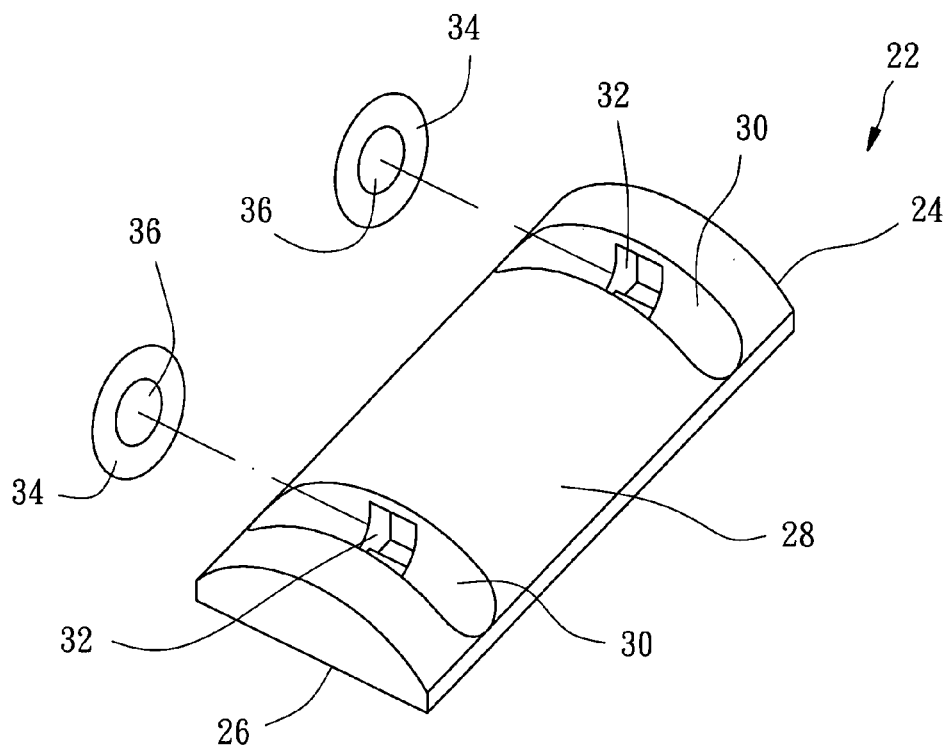
FIG. 2 is a perspective view of the positioning device of the first preferred embodiment of the present invention.

As shown in FIG. 2, the positioning device 22 has a base 24 and two rings 34. The base 22 has a planar bottom 26 and a convex top 28. The base 22 has two channels 30 and two slots 32. The channels 30 are parallel and are open at opposite ends and a top thereof. The slots 32 are under the channels 30 and have an opening at the bottoms of the channels 30 respectively. The slots 32 are wider and shorter than the channels 30 and the openings of the slots 32 are less than the widths thereof. The rings 34 are made of a flexible material, each of which have a hole 36 to be fitted to the lamp 18. The rings 34 have portions received in the slots 32 but leave the holes 34 in the channels 30, so that the lamps 18 rest in the channels 30.

Figure 4:
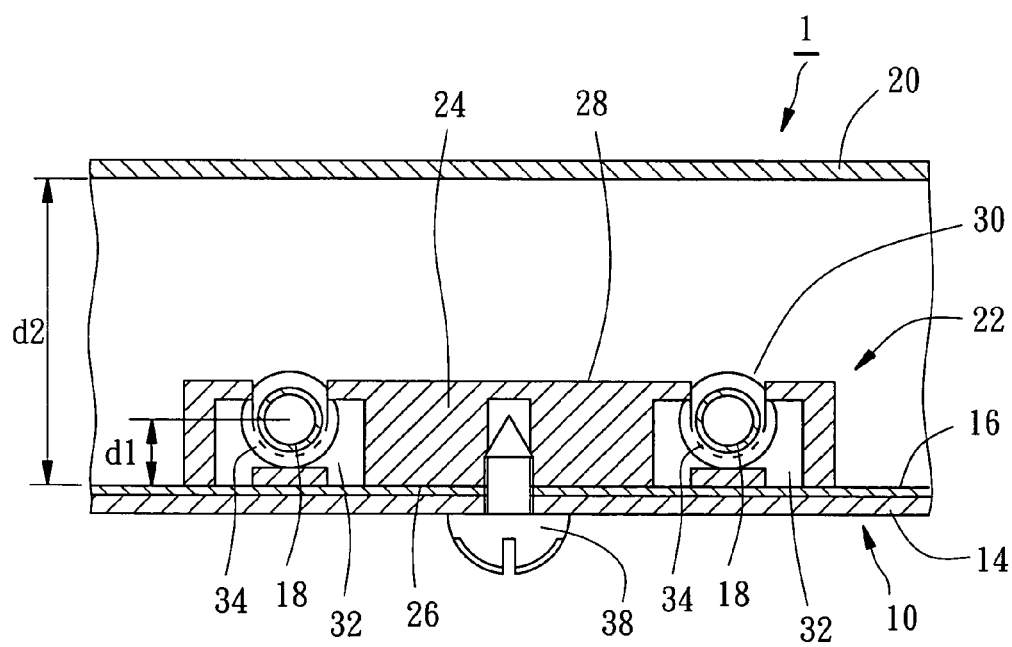
FIG. 4 is a sectional view in part of the first preferred embodiment of the present invention, showing the relationship of the positioning device, the reflective film, the lamp and the diffusive plate.

The positioning devices 22 attach the bottoms 26 thereof on the reflective film 16 and are secured to the bottom plate 14 of the frame 10 by screws 38. As a result, the lamps 18 are firmly positioned at a predetermined level. As shown in FIG. 4, a distance d1 between the lamps 18 and the reflective film 16 is determined by the positioning devices 22 and a distance d2 between the reflective film 16 and the diffusive plate 20 is determined by the frame 10. The designer calculates the properties of the elements of the backlight module and decides the optimal relative locations of the reflective film, the lamps and the diffusive plate to make the positioning devices.

Figure 3:
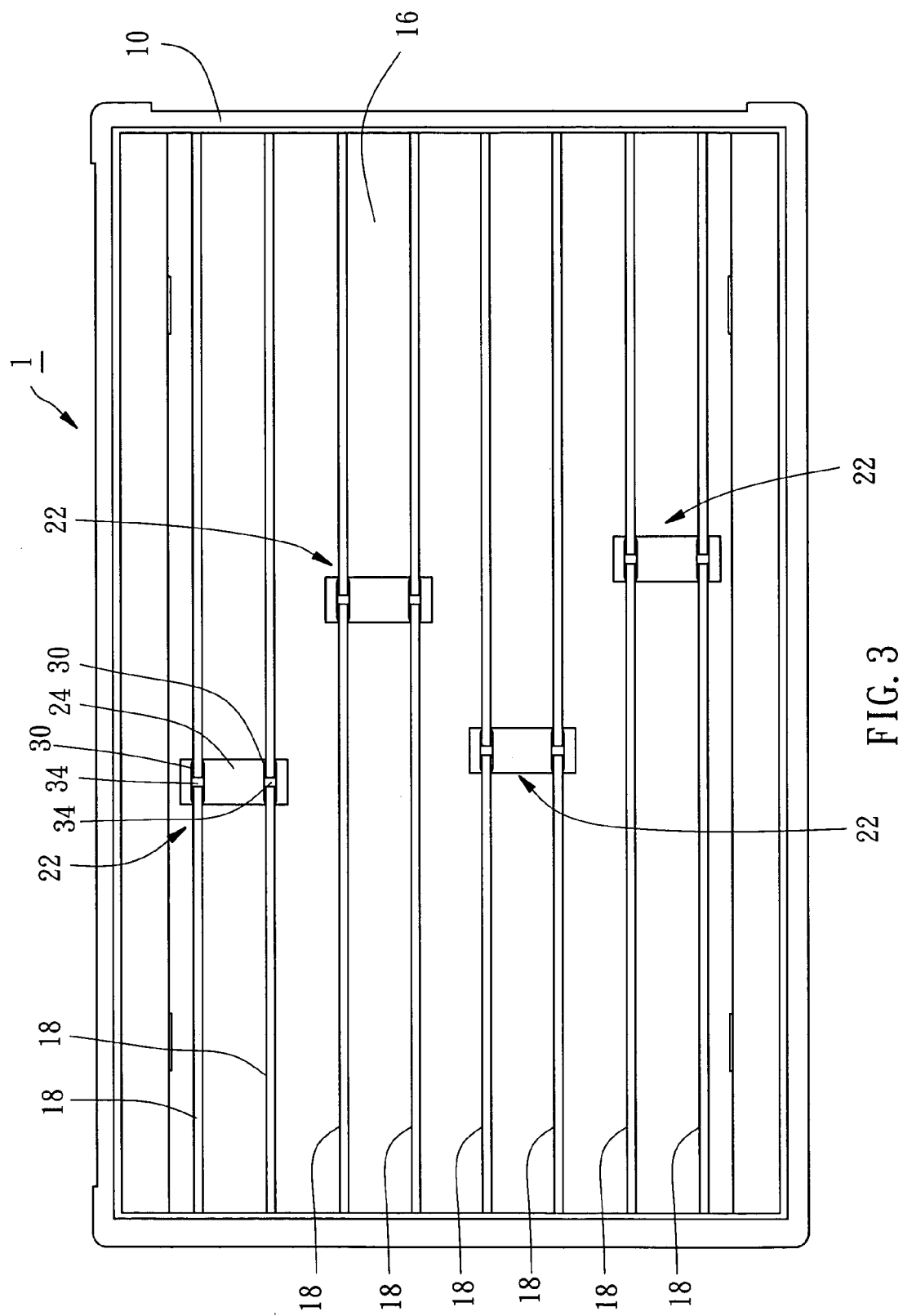
FIG. 3 is a top view of the first preferred embodiment of the present invention.

As shown in FIG. 3, the positioning devices 22 are preferably located at a middle of the frame 10 to provide support for the lamps 18 and to prevent shadows. The bases 24 and the rings 34 of the positioning devices 22 are preferably made by a transparent material. The positioning devices 22 are preferably arranged in a non-symmetrical pattern. Each of the lamps 18 has at least one of the positioning devices 22 to support it. The more positioning devices 22 can cause more shadow area, so that there might be some lamps that have no positioning device to support them.

Figure 5:
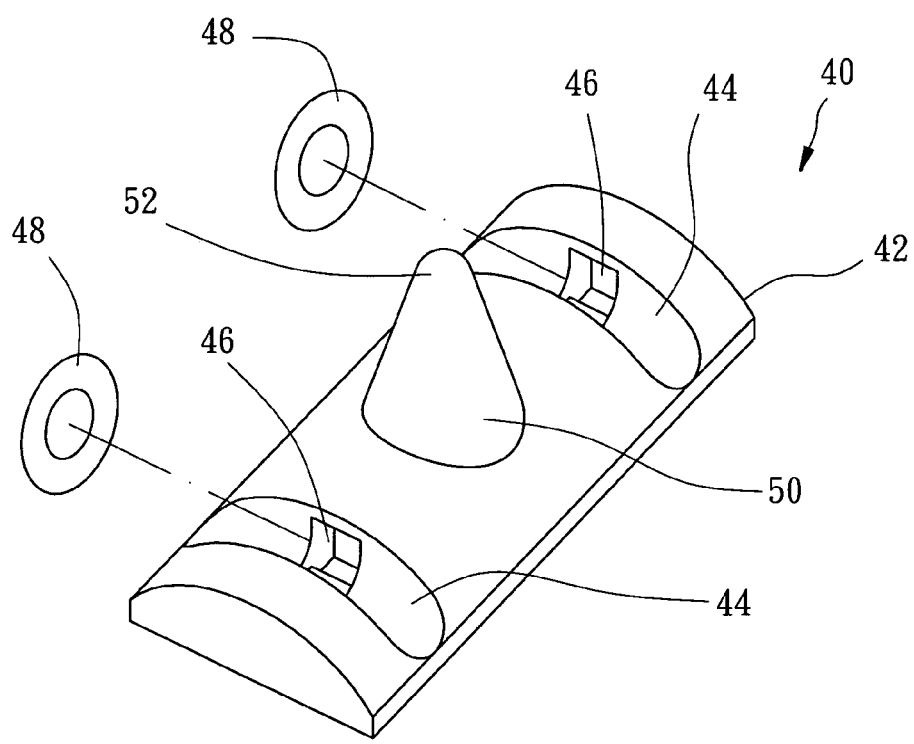
FIG. 5 is a perspective view of the positioning device of a second preferred embodiment of the present invention.

FIG. 5 shows a positioning device 40 of the second preferred embodiment of the present invention, which has a base 42, two channels 44 on a top of the base 42, two slots 46 under the channels 44, two rings 48 mounted in the slots 46 and a post 50 on the top of the base 42 between the channels 44. The post 50 is a cone element with a tip end 52.

Figure 7:
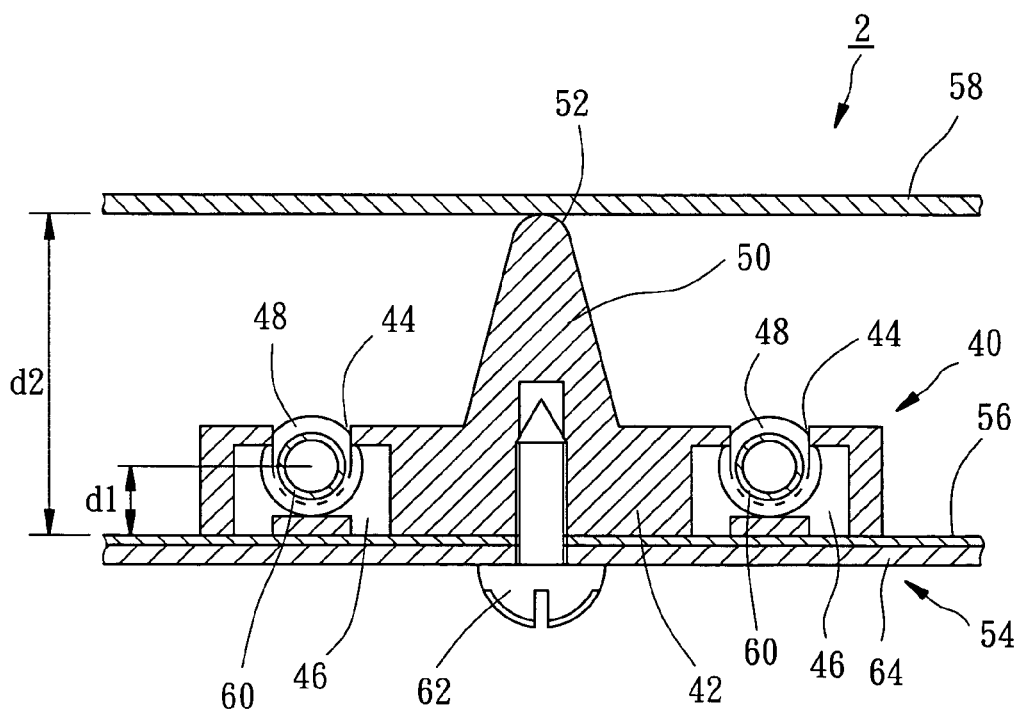
FIG. 7 is a sectional view in part of the second preferred embodiment of the present invention, showing the relationship of the positioning device, the reflective film, the lamp and the diffusive plate.
Figure 6:
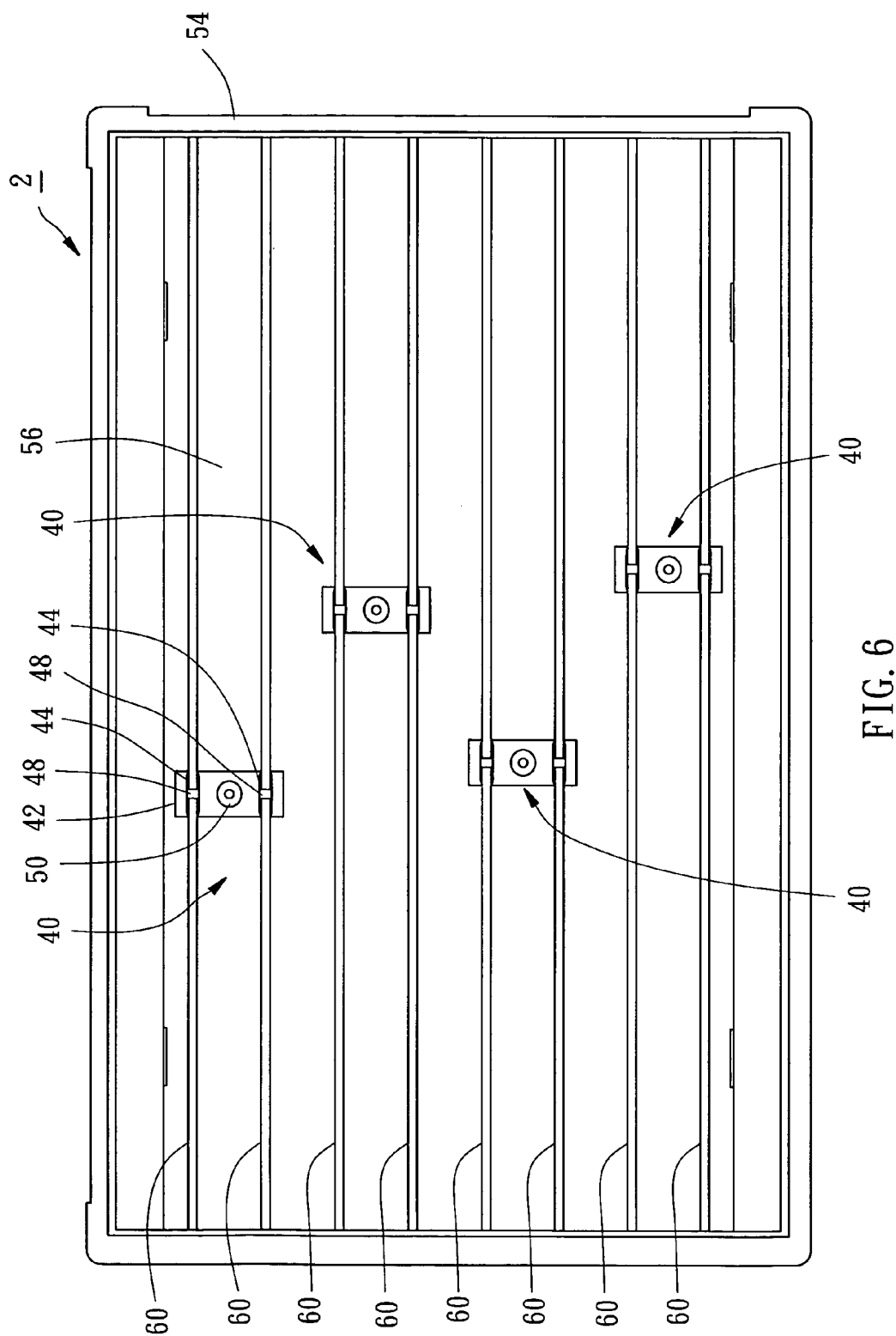
FIG. 6 is a top view of the second preferred embodiment of the present invention.

As shown in FIG. 6 and FIG. 7, a backlight module 2 of the second preferred embodiment of the present invention has a frame 54, a reflective film 56, eight lamps 60 and four of the positioning devices 40. Each of the lamps 60 is fitted to the rings 48 and rests in the channels 44 of the positioning devices 40, as described above. The positioning devices 40 have their bottoms attached on the reflective film 56 and the tip ends 52 of the posts 50 against the diffusive plate 58. The positioning devices 40 are secured on a bottom plate 64 of the frame 58 by screws 62. As shown in FIG. 7, the lamps 60 are kept at a predetermined level d1 from the reflective film 56 and a distance d2 between the reflective film 56 and the diffusive plate 58 is decided by heights of the positioning devices 40 from the bottoms of the bases 42 to the tip ends 52 of the posts 50. As a result, the relative locations of the reflective film 56, the diffusive plate 58 and lamps 60 are decided by the positioning devices 40 that prevent the diffusive plate from warping at a center because of the weight thereof.

Figure 8:
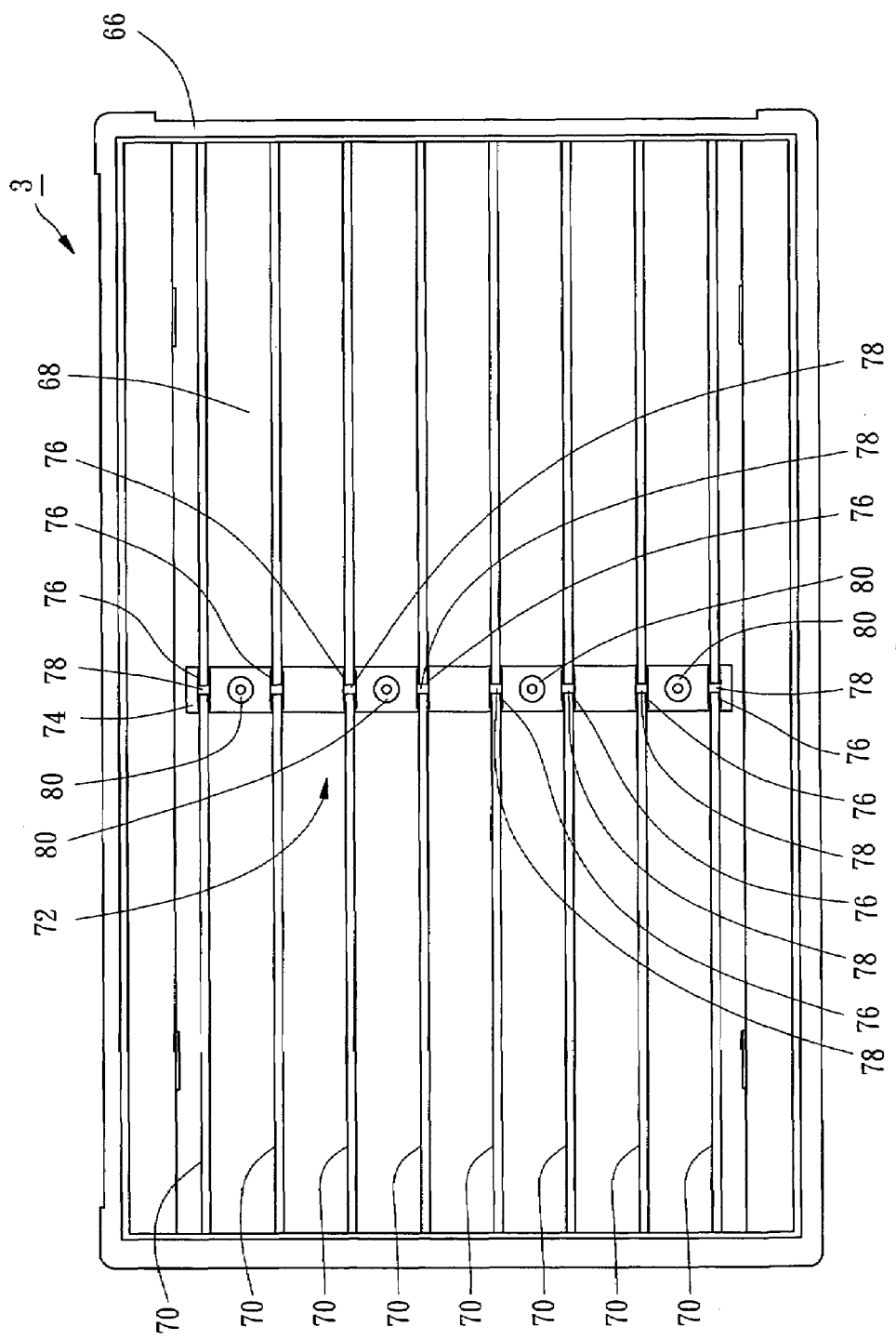
FIG. 8 is a top view of a third preferred embodiment of the present invention.

FIG. 8 shows a backlight module 3 of the third preferred embodiment of the present invention, which is similar to the second preferred embodiment, having a frame 66, a reflective film 68, a diffusive plate (not shown), eight lamps 70 and a positioning device 72. The positioning device 72 has an elongated base 74, on which eight channels 76 are provided and eight rings 78 are mounted in the channels 76. The lamps 70 are fitted to the rings 78 to rest in the channels 76 of the base 74. The base 74 further has four upright posts 80.

Figure 10:
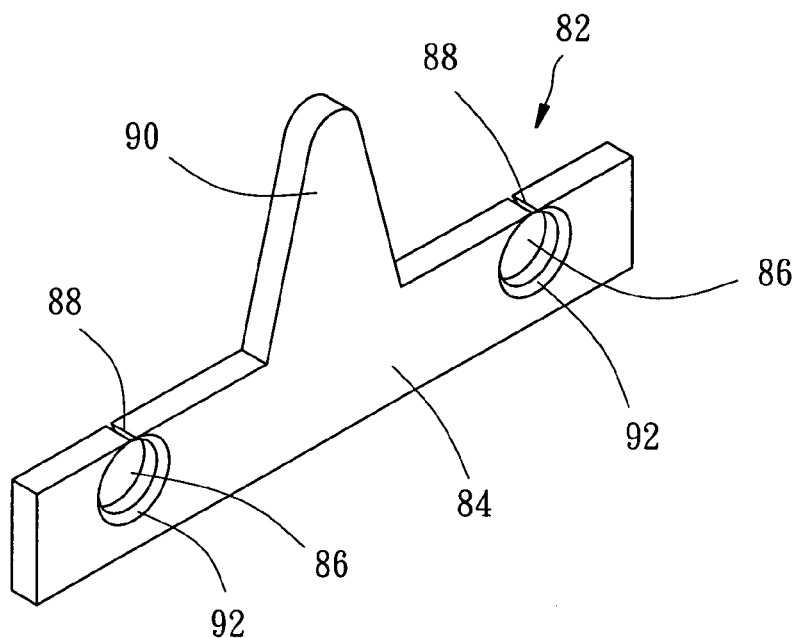
FIG. 10 is a perspective view of the positioning device of the fourth preferred embodiment of the present invention.
Figure 11:
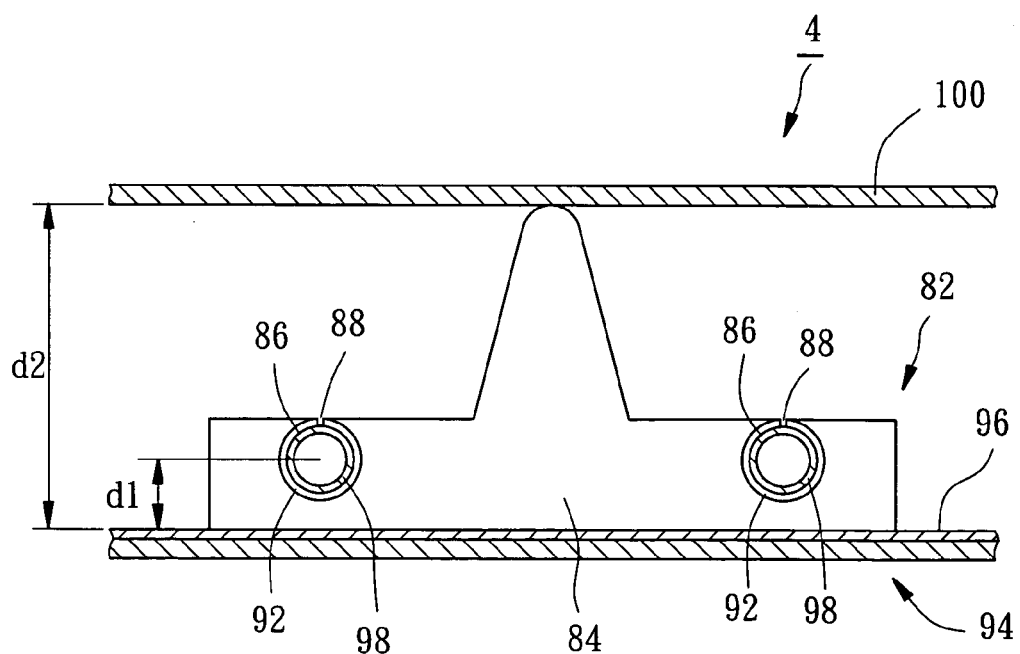
FIG. 11 is a sectional view in part of the fourth preferred embodiment of the present invention, showing the relationship of the positioning device, the reflective film, the lamp and the diffusive plate.

Another embodiment of the positioning device has a positioning device 82, as shown in FIG. 10. This is the fourth preferred embodiment of the present invention. The positioning device 82 has a plate-like base 84, on which two channels 86, two gaps 88 and a post 90 are provided. The channels 86 are open at opposite sides of the base 84 and have tilted faces 92 at ends thereof. The gaps 88 are extended from a top end of the base 84 to the channels 86 respectively. The post 90 is a triangular plate projected from the top end, between the gaps 88, of the base 84.

Figure 9:
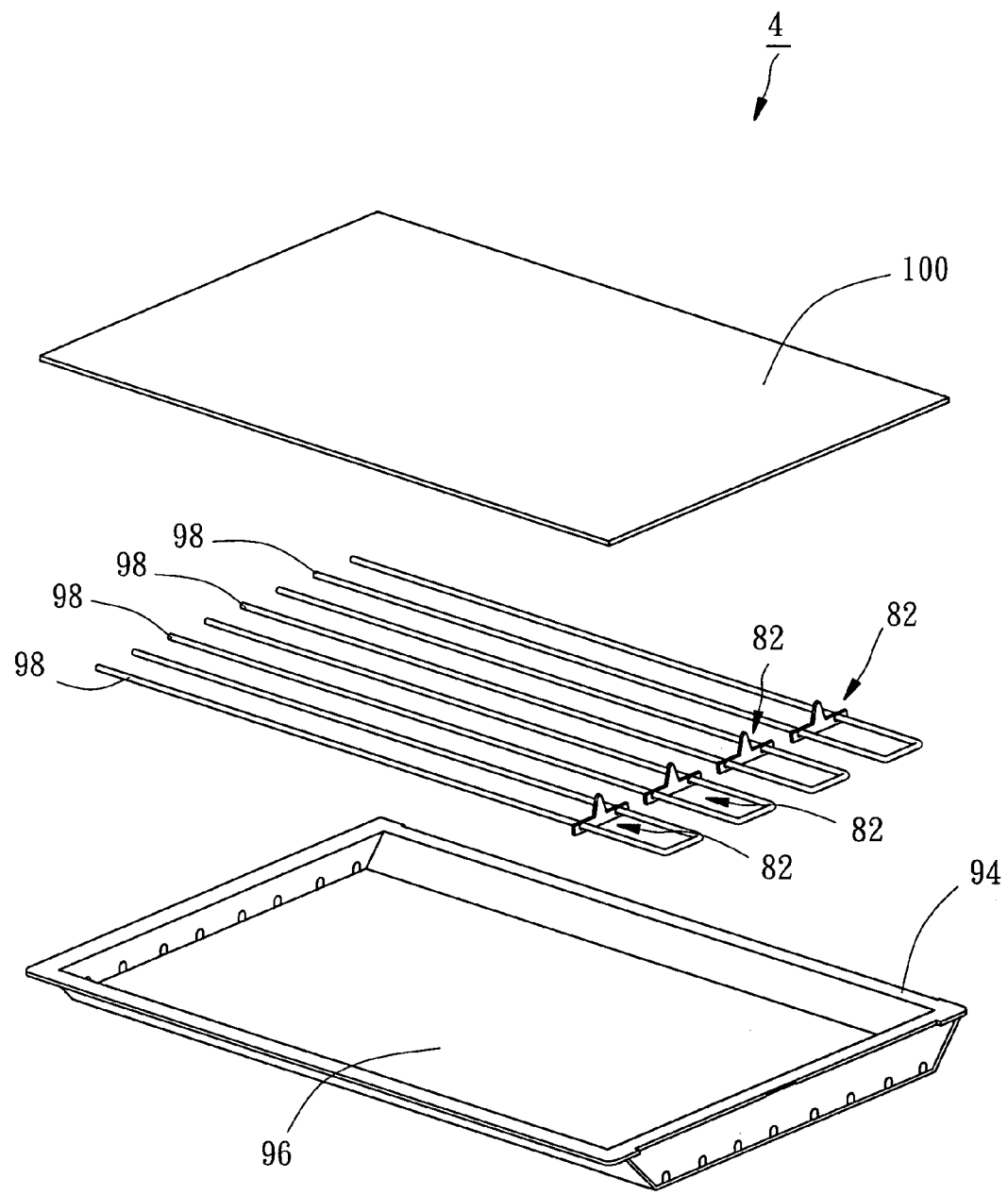
FIG. 9 is an exploded view of a fourth preferred embodiment of the present invention.

As shown in FIG. 9 and FIG. 10, a backlight module 4 of the fourth preferred embodiment of the present invention has a frame 94, a reflective film, 96, four U-shaped lamps 98, a diffusive plate 100 and four of the positioning devices 82. The lamps 98 are fitted to the channels 86 of the positioning devices 82 via the gaps 88 respectively. The bases 84 of the positioning devices 82 rest on the reflective film 96 and the diffusive plate 100 rests on a tip end of the posts 90, so that the lamps 98 are suspended between the reflective film 96 and the diffusive plate 100. A distance d1 between the lamps 98 and the reflective film 96 is decided by the locations of the channels 86 and a distance d2 between the reflective film 96 and the diffusive plate 100 is decided by the height of the posts 90.

The positioning device 82 of the fourth preferred embodiment of the present invention only provides the lamps with a sustained force along the radial orientation of the channel 86 and the axial orientation of the channel 86 is free. While the lamps 98 are turned on and the temperature thereof is rising, the lamps 98 are expended both in diameter and in length. The positioning devices 82 allow the lamps 98 to elongated because of heat. The base 84 of the present invention is preferably made of a flexible material to fit a variety lamp 98 diameters.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight module, comprising:
a frame having a sidewall and a bottom plate;
at least one lamp provided on the frame;
a reflective film attached on the bottom plate of the frame under the lamp;
a diffusive plate provided on the frame above the at least one lamp, and
at least one positioning device having a base and a ring, the base having a top and a bottom and the lamp being fitted to the ring, the ring being flexible and being readily detachably mounted on the base;
wherein a bottom of the base of the positioning device rests on the bottom plate of the frame, such that the lamp is suspended above the reflective film at a predetermined distance.

2. The backlight module as defined in claim 1, wherein the positioning device has a post on the top of the base.

3. The backlight module as defined in claim 2, wherein the post has a tip end.

4. The backlight module as defined in claim 2, wherein an end of the positioning device touches the diffusive plate.

5. The backlight module as defined in claim 1, wherein the base of the positioning device has a channel on the top thereof and the lamp rests in the channel.

6. The backlight module as defined in claim 1, wherein the base of the positioning device has a channel and a slot communicated with the channel on the top thereof and a portion of the ring is received in the slot, the ring being readily removable from and insertable into the slot.

7. The backlight module as defined in claim 6, wherein the channel has a length greater than that of the slot and has a width less than that of the slot.

* * * * *